(No Model.)
S. W. HUDSON.
APPARATUS FOR TRANSMITTING POWER.
No. 278,018. Patented May 22, 1883.
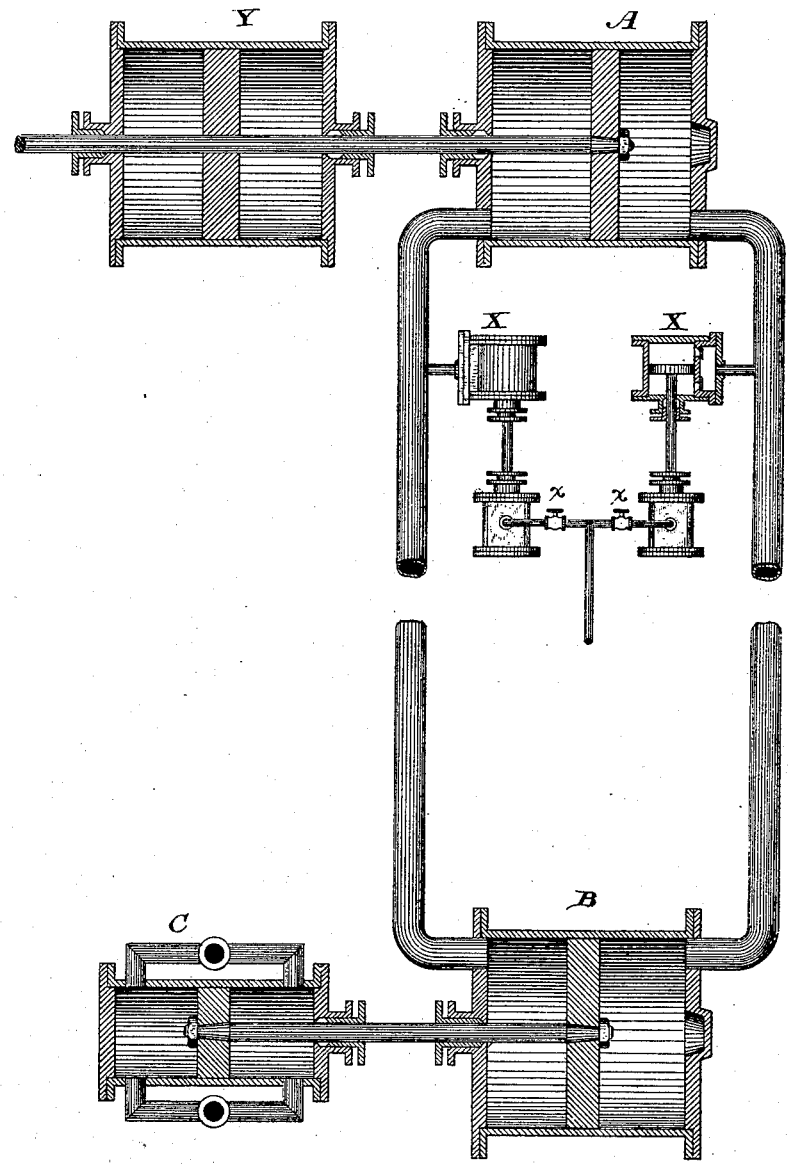
WITNESSES
INVENTOR
Samuel W. Hudson.
By his Attorneys

UNITED STATES PATENT OFFICE.

SAMUEL W. HUDSON, OF HUDSONDALE, PENNSYLVANIA.

APPARATUS FOR TRANSMITTING POWER.

SPECIFICATION forming part of Letters Patent No. 278,018, dated May 22, 1883.

Application filed November 16, 1882. (No model.)

*To all whom it may concern:*

Be it known that I, SAMUEL W. HUDSON, of Hudsondale, in the county of Carbon and State of Pennsylvania, have invented certain new and useful Improvements in Apparatus for Transmitting Power, of which the following is a specification.

In transmitting power beyond the shortest and most convenient distances the use of shafting, endless belts, and gearing involves an immense amount of friction, requires considerable power to overcome the weight of the parts, and of course the expense of construction is very great.

My invention relates to that class of apparatus in which the power is transmitted from one point to another by imparting motion to a column of a compressed gaseous medium—such as atmospheric air—contained in a system of pipes or conduits, and having a circulation from the primary motor to the driven motor or machine and back to the primary motor; and the invention consists in the employment of a force-pump connected with each of the pipes, which extend from the primary motor to the driven motor on each side of the apparatus, so as to obtain and maintain the desired equal pressure in each side of the system.

The accompanying drawing represents somewhat diagrammatically an organization involving the principles of my invention, and sufficiently illustrates the various parts to make the matter clear to those skilled in the art.

A represents the primary motor or actuating cylinder and piston, which is driven by any suitable power or motor. In this instance it is indicated as being driven by a piston and cylinder, Y, which may be actuated by steam. From the opposite ends of the cylinder A pipes, either rigid or flexible, and which may be of any desired length, extend to the corresponding opposite ends of the cylinder of the driven motor or machine B, which may be situated at any desired point. A piston-head reciprocates within this cylinder and actuates a piston, the power of which may be used for any purpose, but is indicated in the drawing as driving a double-acting pump, C. It will be observed that there is a free communication from one side of the piston-head A to the corresponding side of the piston-head B, and a like free communication from the opposite side of the piston A to the corresponding side of the piston-head B. With the pipes and cylinders filled with a medium of sufficient tension to transmit the power or thrust of one piston-head to the other, it will be obvious that when the piston-head A is reciprocated the power will be communicated to and the piston-head B will copy the reciprocations.

In order to produce a uniform degree of compression on each side of the system of pipes or conduits, I employ compressing-pumps X, one for each side of the apparatus. These pumps may be actuated by steam from the same boiler that supplies the cylinder Y, which drives the motor A; or they may be driven in any suitable manner to give the amount of power required. By this means, at the very start of the apparatus, an equal degree of pressure or tension of the air is provided in each side of the apparatus.

In order to compensate for leakage and maintain a given and uniform pressure within the pipes, the compressing-pumps X may obviously be governed by a device which may be thrown into and out of operation by the pressure of the air within the pipes, as will be well understood; or an attendant by operating the steam-cocks *x x* may insure the uniform running of the apparatus.

What I claim as my invention is—

The combination, substantially as set forth, of a motor, Y, the primary motor A, consisting of the cylinder and the piston-head actuated by the motor Y, the cylinder B and the piston-head moving therein, the pipes connecting the opposite corresponding ends of said cylinders, and an air-compressing pump connected with each of said connecting-pipes.

In testimony whereof I have hereunto subscribed my name.

SAMUEL W. HUDSON.

Witnesses:
L. H. BARBER,
F. BERTOLETTE.